United States Patent [19]

Stanley

[11] Patent Number: 5,076,229

[45] Date of Patent: Dec. 31, 1991

[54] INTERNAL COMBUSTION ENGINES AND METHOD OF OPERTING AN INTERNAL COMBUSTION ENGINE USING STAGED COMBUSTION

[76] Inventor: Russel S. Stanley, 4470 Cottage Grove, Uniontown, Ohio 44685

[21] Appl. No.: 592,834

[22] Filed: Oct. 4, 1990

[51] Int. Cl.$^5$ .................... F02B 19/04; F02B 19/18
[52] U.S. Cl. .................... 123/289; 123/256; 123/661
[58] Field of Search .............. 123/256, 257, 260, 261, 123/269, 289, 299, 65.5, 661, 671

[56] References Cited

U.S. PATENT DOCUMENTS

| | | | |
|---|---|---|---|
| 2,224,973 | 12/1940 | Lorraine et al. | 123/289 |
| 3,994,267 | 11/1976 | Eisele et al. | 123/275 |
| 4,151,814 | 5/1979 | Doieg | 123/65.5 |
| 4,258,686 | 3/1981 | Matsuno et al. | 123/671 X |
| 4,498,434 | 2/1985 | Baltz et al. | 123/187.5 R |
| 4,566,413 | 1/1986 | Maly | 123/256 |
| 4,784,098 | 11/1988 | Artman | 123/262 |
| 4,788,942 | 12/1988 | Pouring et al. | 123/26 |
| 4,829,958 | 5/1989 | Duret | 123/316 |

FOREIGN PATENT DOCUMENTS

| | | | |
|---|---|---|---|
| 2809968 | 9/1979 | Fed. Rep. of Germany | 123/289 |
| 0449953 | 7/1936 | United Kingdom | 123/289 |

*Primary Examiner*—Willis R. Wolfe, Jr.
*Attorney, Agent, or Firm*—Oldham & Oldham Company

[57] ABSTRACT

An internal combustion engine and method of operation is disclosed as having a combustion chamber design which allows for staged combustion within the chambers. The internal combustion engine of the invention is designed as a split chamber, staged combustion engine which comprises a cylinder and having at least two regions formed therein. Within the cylinder is a piston slidably disposed therein to form a plurality of combustion chambers in association with the cylinder, and particularly at least one primary and secondary combustion chamber which are communicable with one another. Fuel delivery is accomplished by fuel injectors or the like associated with the primary combustion chamber, being operable to admit fuel into the primary combustion chamber at preselected intervals and in predetermined amounts. The fuel admitted in top the primary combustion chamber is ignited to begin initial combustion of the fuel as a first stage of combustion. After initial combustion starts, the ignited fuel mixture within the primary combustion chamber is forced into the secondary combustion chamber for continued burning thereof in a second stage of combination. The apparatus and method of the invention results in a number of advantages including reducing unburned hydrocarbons and the formation of nitrous oxides in the combustion process. Additionally, the engine design and method of operation will allow higher efficiency and high RPM operation and will also produce large amounts of torque at lower power settings as well as higher compression ratios for better fuel economy and power output.

23 Claims, 5 Drawing Sheets

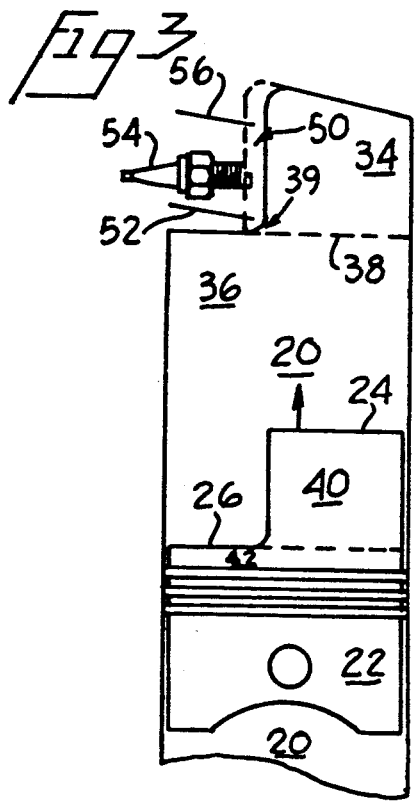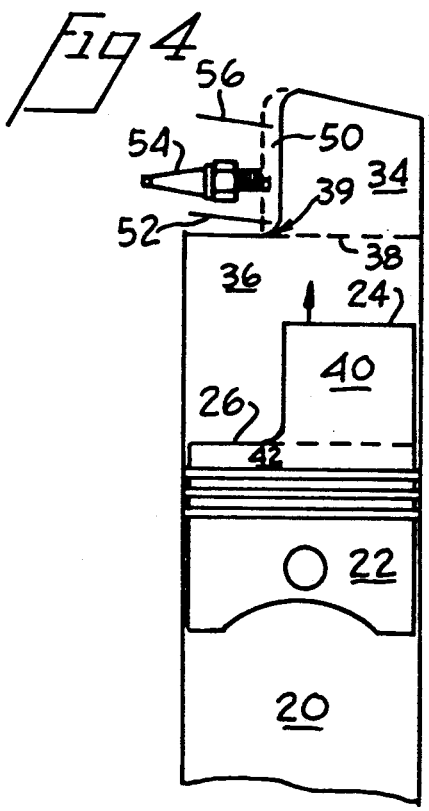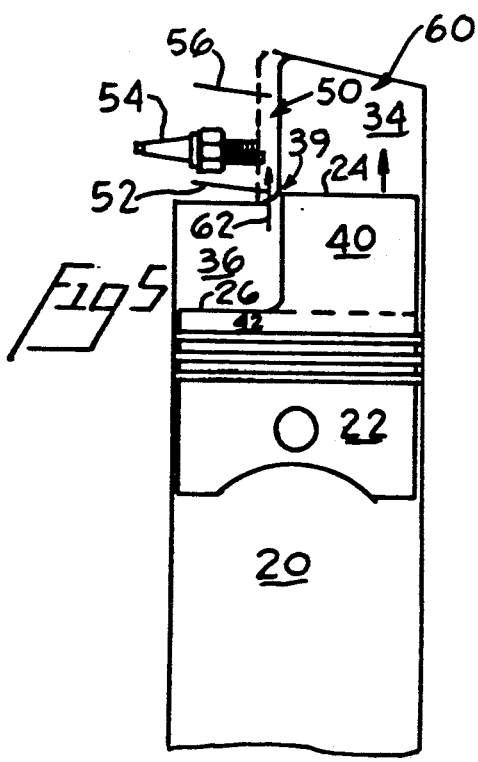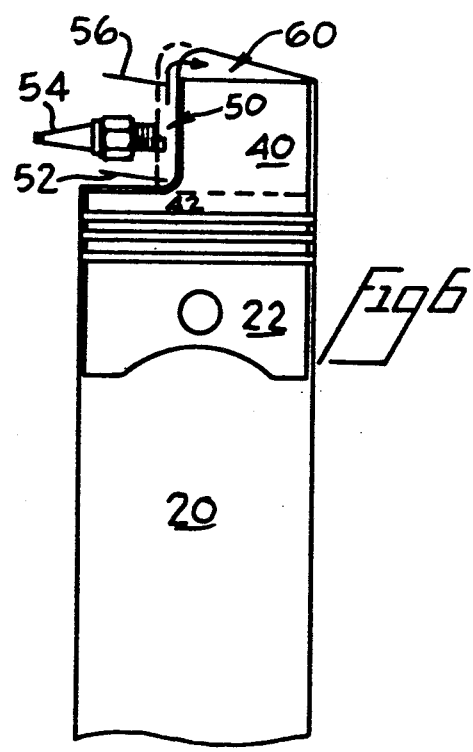

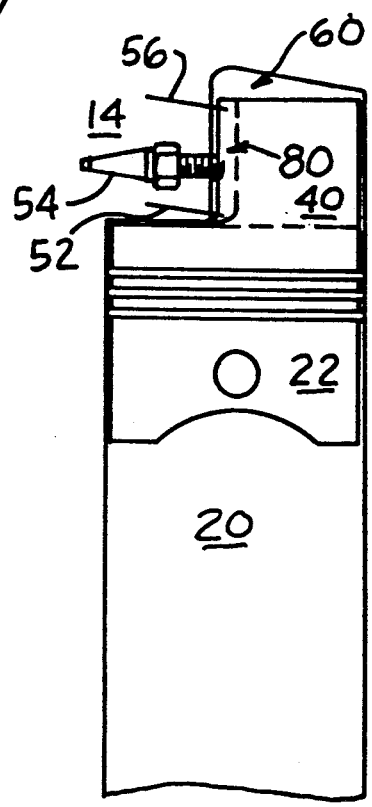
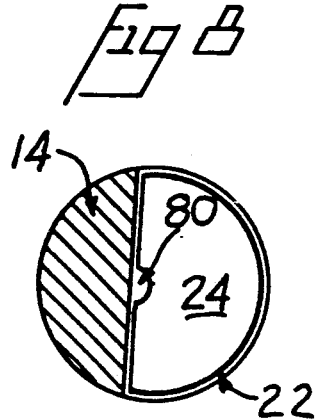
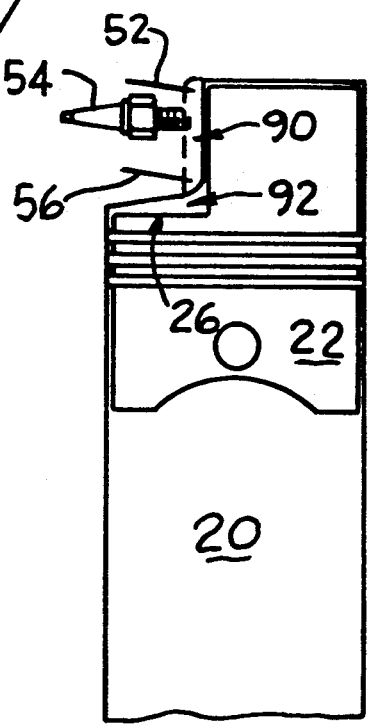
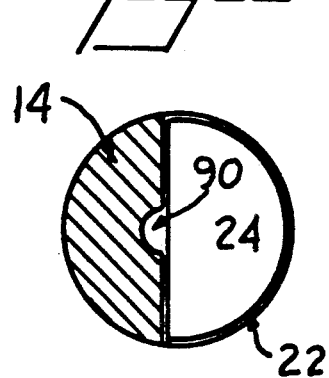

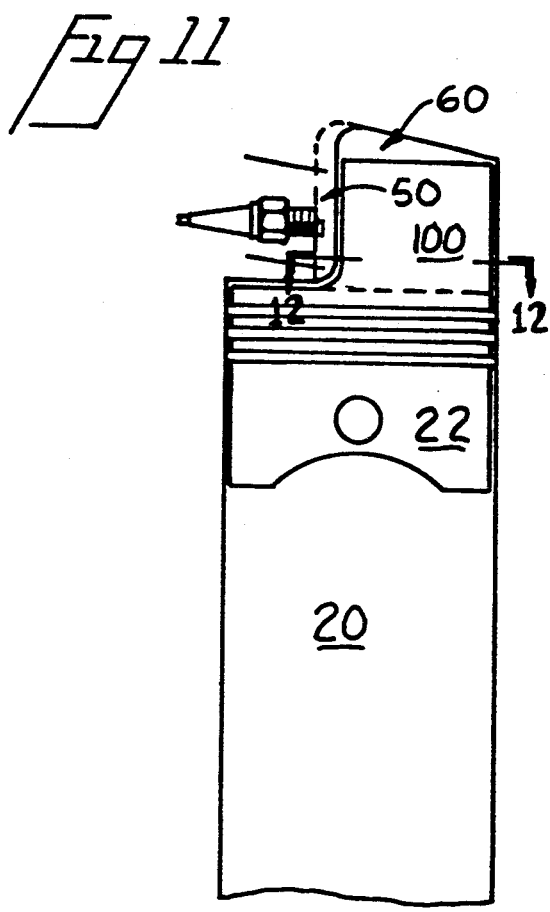
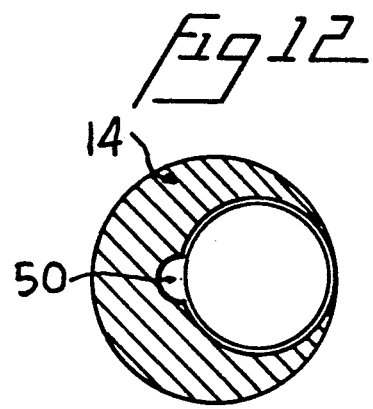
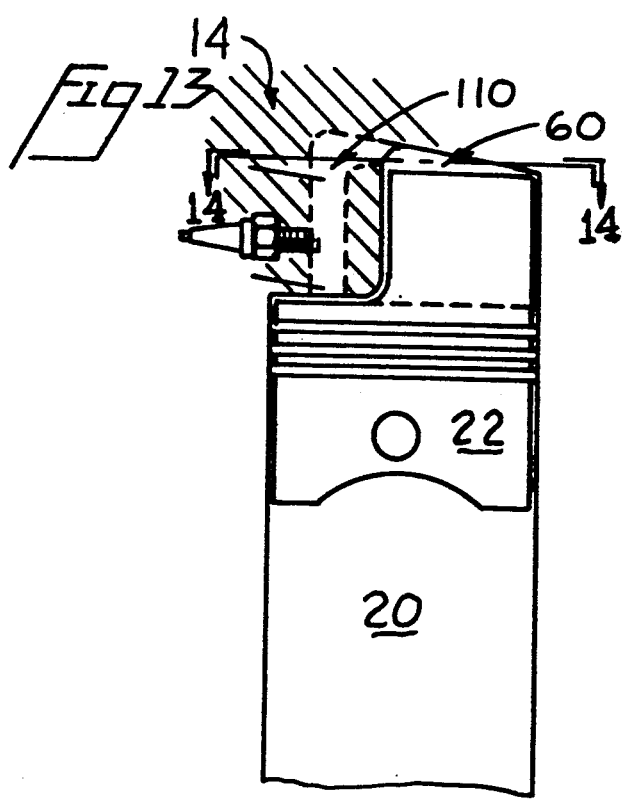
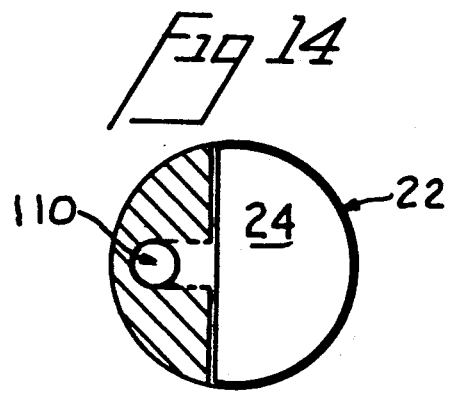

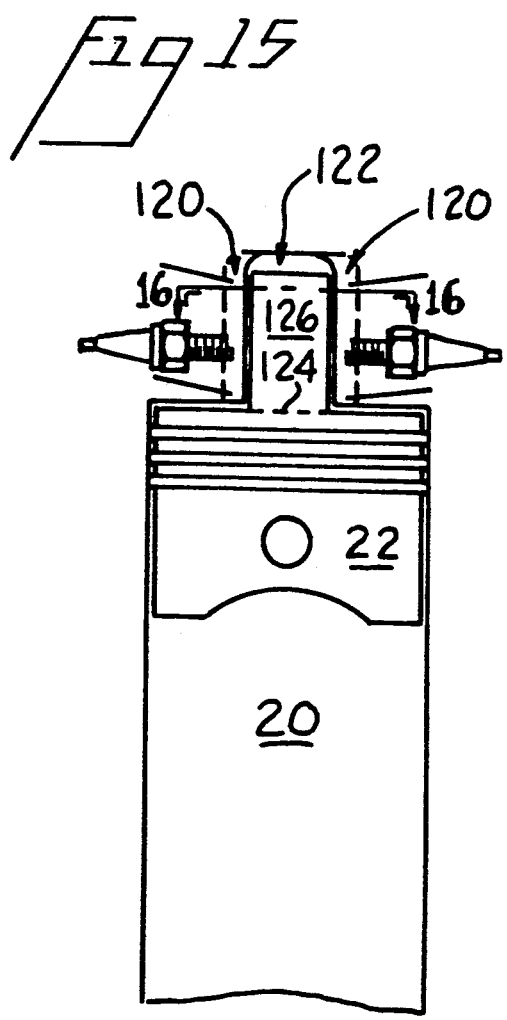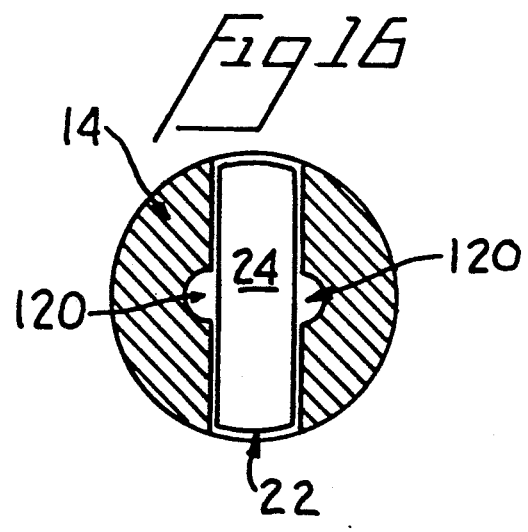

INTERNAL COMBUSTION ENGINES AND METHOD OF OPERTING AN INTERNAL COMBUSTION ENGINE USING STAGED COMBUSTION

FIELD OF THE INVENTION

This invention relates to internal combustion engines and the methods of operation thereof to allow reduction in unburned hydrocarbons and the emissions of other noxious gases while allowing higher efficiency and power to be obtained from the engine. More particularly, the invention relates to an internal combustion engine and method of operation wherein a split combustion chamber design allows for a staged combustion process using direct injection techniques to achieve more effective burning of the hydrocarbon fuel mixture as well as achieving breakdown of formed nitrous oxides to achieve desirable emission characteristics while achieving higher compression ratios and producing more usable power and better fuel economy.

BACKGROUND OF THE INVENTION

As reliance upon the internal combustion engine grows in our modern society, several driving factors have led to the demand for changes in the design and operation of such engines. As the available fuel supply slowly decreases, it is an objective of internal combustion engine design to provide for improved fuel consumption and economy while not adversely impacting the desired performance of such engines. Alternatively, increasing demands to satisfy environmental concerns associated with such engines have led to the need for providing complex systems to reduce emissions of noxious gases such as unburned hydrocarbons and nitrous oxides formed in the combustion process of internal combustion engines. These objectives in the design of internal combustion engines create conflicting design problems to a great extent as methods used to reduce emissions of noxious gases have tended to increase fuel consumption and vice versa.

In conventional spark ignition internal combustion engines, a gasoline type fuel is utilized in the combustion process. Conventionally, an air to fuel ratio which allows ignition of the mixture by use of a spark plug or the like must be provided. It is well known that the air/fuel mixture can only be ignited by a spark from a spark plug if the ratio of air to fuel is of the correct stoichiometric proportions. To achieve this, the volume of fuel and air introduced into a combustion chamber must be closely regulated in accordance with a particular engine load condition which will vary greatly upon operation of the engine. Thus, under all load conditions, the air to fuel ratio must be maintained within close tolerances and in accordance with the desired engine load which is normally accomplished by means of carburetors or fuel injectors with the volume of air/fuel varied using throttling techniques. The technology with respect to various liquid or gas fuels used in internal combustion engines has developed to the point where combustion efficiencies of the fuel are relatively high. Thus, the problems of inefficient or incomplete burning of the fuel within the air/fuel mixture in the combustion process are created to some degree by improper mixing of the air and fuel in the correct stoichiometric proportions which can be readily ignited by means of the spark.

To achieve higher efficiency using hydrocarbon fuels, the heat energy of the fuel should be released at the proper time in the engine cycle to harness the combustion efficiency of the fuel and facilitate more complete burning thereof. Theoretically, a lean fuel to air ratio increases thermal efficiency as the amount of fuel in the mixture decreases creating higher flame temperatures and thereby creating more work energy in the engine and allowing for more complete burning fuel. Conversely, a lean mixture also tends to increase the formation of nitrous oxides. Unfortunately, the lean fuel to air ratios desirable to achieve more complete burning and higher thermal efficiency in engine operation do not coincide with the air/fuel mixture requirements associated with spark ignition internal combustion engines.

It is also found that the effects of throttling conventionally utilized in internal combustion engines to achieve the desired output for a given load conditions create "pumping" losses in operation of the engine. The use of throttle plates in the conventional engine create vacuum conditions which are adverse to proper engine operation. For example, during part throttle, high vacuum conditions, a conventional spark ignition engine would require a great amount of ignition advance to allow enough time to complete combustion prior to exhausting the by-products of the combustion process. Ignition advance is necessary due to the slowing of the burning process under vacuum conditions wherein the fuel mixture will require more time to burn. The necessity of operating the engine in this manner causes pressure build up in the cylinder head before top dead center of piston travel within the engine, thereby causing some of the thermal energy created in the combustion process to be wasted as it is essentially being used against the direction of crank shaft rotation. Additionally, under part throttle conditions in conventional engines, the combustion process cannot be optimized, and burning of the fuel occurs at relatively high temperatures. This creates disassociation of the combustion products while slowing combustion thereby resulting in unwanted emissions and incomplete burning of the fuel. Similarly, during full power higher RPM operation of a conventional spark ignition engine, again a great amount of ignition advance is required as less time is available for fuel burn to take place in the combustion chamber. Similar problems as discussed relative to part throttle engine operation are thus encountered. It is therefore seen that at almost any load condition, ignition advance requirements result in undesirable effects in not effectively utilizing the expansive energy created by combustion which can be converted to usable rotary torque.

Other deficiencies in the conventional spark ignited internal combustion engine are also apparent. A conventional engine has a calculated theoretical compression ratio of about 9 to 1. Under part throttle conditions, the effective compression ratio is normally far below the desired theoretical compression ratio and is commonly found to be 3 to 1 or less. This condition exists again due to the use of throttle plates designed to produce lower power under part throttle conditions. Additionally, compression ratios are limited in conventional engines to around 9 or 10 to 1 by the phenomena of preignition which occurs in the both part or full throttle modes. The phenomena of preignition occurs when pressure and temperature become high enough to burn fuels spontaneously in different areas of the combustion chamber after spark ignition has occurred, but before the normal burning of the fuel mixture has reached all areas within the combustion chamber. This limitation on the achievable compression ratio within the engine in turn places upper limits on achievable fuel economy and power, and the ability to optimize use of the heat energy released during combustion by not allowing higher pressures within the cylinder.

Various design modifications have attempted to account for some of the deficiencies found in the conventional engine. For example, the use of precombustion chambers have been utilized to provide better combustion characteristics within the main combustion chamber. In a standard design of this type, a rich fuel to air mixture is admitted into the pre-combustion chamber and ignited externally of the conventional engine cylinder. The ignited fuel mixture is then injected into the main combustion chamber of the engine cylinder which has a fuel mixture which is a more lean mixture than could be ignited by spark. The design allows more efficient burning of the mixture in the main combustion chamber but has added complexity to the design as well as significantly to the cost of the engine. The small precombustion chambers have also been found to present problems with respect to cleaning and maintenance to ensure proper functioning. Some examples of the use of pre-combustion chambers are found in U.S. Pat. Nos. 3,994,267 and 4,784,098. These patents also utilize a stratified charge combustion process for attempting to optimize combustion characteristics over the range of load conditions encountered in operation of the engine. Other techniques attempt to achieve better mixing of the air and fuel injected into the combustion chamber or enrichment techniques as found in U.S. Pat. Nos. 4,498,434, 4,788,742 and 4,829,958. Again, the complexities and cost of these systems inhibit their effective use.

Some of the deficiencies found in the design of internal combustion engines have been addressed in part by diesel engine design. Specifically, diesel engine design eliminates the use of throttling plates, and the need for throttling, which directly results in higher thermal efficiency and fuel economy. The diesel engine supplies the amount of fuel needed for the particular load condition which the engine is under, and combustion of the fuel occurs due to the temperature/pressure in the cylinder.

Although the diesel engine seemingly provides better fuel economy, the fuel is not burned fast enough in many situations, resulting in high emissions of noxious materials which is at odds with environmental concerns. The diesel engine is basically a very "dirty" in its operation, as it produces a considerable amount of particulate matter, other noxious aeromatics and nitrous oxides in its emissions. The diesel engine is also very efficient because it does not use throttle plates, and can burn fuel very lean and has very high compression ratios. The diesel engine produces more power per unit of fuel burned, but is limited to lower rpms compared to a gasoline engine. Thus, even though the torque produced by the engine is high, it cannot turn high rpms to produce high horse power like a gasoline engine. When the diesel engine is used with automobiles, some of the advantages are also negated. In order to achieve the output desired from the engine, diesel engines require high working pressures which in turn require heavy duty materials to provide sufficient strength to accommodate such pressures. Such considerations add significantly to the weight of the diesel engine as well as the cost of producing the engine resulting in a design which reduces the fuel economy advantages obtainable in theory. Heavy duty materials are also necessary to due a form of preemission caused by diesel fuel not burning rapidly in the engine. This preignition phenomenon makes it necessary for make all engine parts heavier then otherwise necessary in order to avoid breaking thereof. The preignition caused by the fuel not burning rapidly enough in the diesel engine also creates a great amount of noise and vibration in the operation of the engine in automobiles, which is an undesirable aspect for the consumer. The high speeds associated with automotive use of diesel engines has led to the development of various specialized designs to improve the combustion characteristics of high speed diesel engines.

In particular, diesel engine design has resorted to the use of a swirl chamber associated with a main combustion chamber to allow a more efficient mixing and burning of the fuel in high speed diesel engines. In U.S. Pat. No. 4,662,330, a swirl chamber type diesel engine includes a modified "clover leaf" type recess in the piston crown which promotes desirable flame dispersion and good mixing of the flame with the air in the main combustion chamber. This in turn allows the development of the desired compression ratio during the compression phase of the engine cycle. Similarly, in U.S. Pat. No. 4,122,804, a diesel engine includes a combustion chamber arrangement including a precombustion chamber having a discharge passage which is in alignment with a pocket formed under the valve head adjacent the piston and at the piston top dead center position. Air discharge into the prechamber during each compression stroke generates a swirl which is directed to the pocket formed in the construction so as to provide a temporarily locally rich mixture wherein combustion occurs under conditions relatively unfavorable to nitrous oxide production. Although the use of swirl chambers and special constructions such as shown in these prior patents allow comparatively high engine speeds, fuel economy is adversely impacted and efficiency reduced.

It therefore would seem to be desirable to provide an internal combustion engine which attempts to achieve advantages which are theoretically obtainable in diesel engines for use with high speed engines for automotive use, while avoiding the disadvantages which have been found in attempting to design diesel engines for such requirements. It is additionally thought to be desirable to provide an internal combustion engine which will perform with higher efficiency while correspondingly reducing unburned hydrocarbons and nitrous emissions. In order to accomplish such characteristics, the required amount of ignition advance should be reduced to allow a greater proportion of the combustion process to occur at or after top dead center of piston travel within the engine to achieve the greatest amount of torque generation from the engine.

One attempt at providing an engine with diesel-like fuel economy and low emissions of carbon dioxide, without the deficiencies of noise, exhaust fumes and other problems associated with diesel engines has been proposed recently. In an experimental 1.7-liter 4-cylinder engine developed by Volkswagen, a direct injection fuel system developed by Stanadyne Automotive Corp. is utilized. The engine is claimed to resemble a diesel engine in many respects, but in a spark ignition type engine. An ultra-lean air/fuel mixture is used along with a high compression ratio. In the construction, combustion chambers are recessed in the piston crowns, and a pencil-slim nozzle allows fuel injectors fitted in the cylinder head to be positioned at the edge of each combustion chamber to introduce liquid gasoline tangentially to the cylinder wall. A two-stage injection process achieves a peak fuel pressure in the combustion chamber after which ignition occurs to prevent preignition effects. A special spark plug configuration including a long central electrode and a trio of ground electrodes help to provide proper combustion characteristics. In this engine, it is stated that the output is controlled by the amount of fuel sprayed, and not by how much air is emitted through a throttle plate so as to simplify the engines induction plumbing and allowing reductions in pumping losses. Problems are thought to be present in this system such as inability to adjust the system for optimizing fuel economy and desired emission characteristics.

SUMMARY OF THE INVENTION

Based upon the foregoing, it is a main object of the present invention to provide an internal combustion engine and method of operating such an engine which achieves the desired effects of reducing unburned hydrocarbons and nitrous oxide emissions while obtaining increased efficiency and optimizing operating characteristics of the engine.

It is another object of the invention to provide an internal combustion engine design which eliminates the need for throttle plates and thereby eliminates or greatly reduces most pumping losses in operation of the engine.

It is another object of the invention to provide an internal combustion engine and method of operation which will greatly reduce the amount of ignition advance required in the combustion process to allow more of the fuel to be burned at or after top dead center of piston travel to increase efficiency of the engine.

It is yet another object of the invention to provide an internal combustion engine design and method of operation which allows higher compression ratios to increase efficiency in utilization of the available heat from the combustion process.

Another object of the invention is to provide an internal combustion engine and method of operation which is resistant to the phenomena of preignition to provide more control over the combustion process and allow higher compression ratios to be achieved.

It is yet another object of the invention to provide more complete burning of the fuel in the combustion process such that no air injection system will be required downstream of the exhaust to reburn any unburned hydrocarbons remaining in the exhaust gases. The invention will achieve essentially complete burning of the fuel such that very low levels of unburned hydrocarbons will be present thereby eliminating the need for using catalytic converter with the engine. Similarly, exhaust gas recirculation systems will not be necessary due to the inherently low formation of nitrous oxides in the engine and its method of operation.

Still another object of the invention is to provide an internal combustion engine and method of operation wherein fuel will be injected only after exhaust from the combustion chamber during a cycle has been completed, such that no loss of fuel to the exhaust will be possible.

Another object of the invention is to provide an internal combustion engine and method of operation wherein the injected fuel is made to burn more rapidly such that a quick burning fuel may be preferable such as a low octane gasoline, thereby avoiding the need for higher octane fuels to achieve better performance in the engine.

Yet another object of the invention is to provide an internal combustion engine which may allow the more effective use of a turbo charger under all load conditions.

It is yet another object of the invention to provide an internal combustion engine and method of operation for use with spark ignition engines as well as compression ignition engines while achieving the desired economical and environmental advantages and much higher compression ratios. The invention has application to reciprocating and rotary piston engine designs as well as four-stroke and two-stroke combustion cycles.

These and other objects of the invention are accomplished by means of a combustion chamber design in an internal combustion engine which allows for staged combustion within the chambers. The internal combustion engine of the present invention is designed as a split chamber, staged combustion engine which comprises means defining a cylinder and having at least two regions formed therein. Within the cylinder is a piston means slidably disposed therein to form a plurality of combustion chambers in association with the cylinder, and particularly at least one primary and secondary combustion chamber which are communicable with one another. Fuel delivery means are provided and associated with the primary combustion chamber, being operable to admit fuel into the primary combustion chamber at preselected intervals and in predetermined amounts. Also provided in association with the primary combustion chamber is means for igniting the fuel admitted into the primary combustion chamber to begin initial combustion of the fuel within the primary combustion chamber. After initial combustion starts, the ignited fuel mixture within the primary combustion chamber is forced into the secondary combustion chamber for continued burning thereof.

More particularly, the means defining the cylinder within the internal combustion engine are formed as a split chamber design with the piston means being shaped so as to correspond to the regions formed within the cylinder to a great extent. The split chamber design of the cylinder as well as the design of the piston means will essentially split the cylinder into two or more compartments by the shearing action of the piston means relative to the plurality of regions formed in the cylinder. The primary combustion chamber is formed as a transfer tube or passage formed as part of the cylinder, piston or both the cylinder and piston within the engine. Associated with the primary combustion chamber is a fuel injection system which will directly inject fuel into the primary combustion chamber to be mixed with air passing therein as a result of the compression created by the piston means within the cylinder. The rate of fuel injection will be matched to the rate of air passing through the primary combustion chamber to form a fuel rich mixture within the primary combustion chamber. A spark plug or other means for igniting the fuel air mixture within the primary combustion chamber is provided to ignite the fuel rich mixture as it travels through the primary combustion chamber to the secondary combustion chamber. The secondary combustion chamber contains only air and allows completion of the burning of the fuel air mixture in a second stage of combustion. For low load conditions of the engine, one fuel injection system may be sufficient to provide the proper amount of fuel which is directly injected into the primary combustion chamber, or alternatively for use with higher load conditions, secondary or subsequent fuel delivery means may be provided in association with the primary combustion chamber wherein fuel will be injected into a burning mixture within the primary combustion chamber. The design of the cylinder and piston means as well as that of the primary and secondary combustion chambers can vary to a great extent while following the general principles of the invention, thereby allowing a great amount of flexibility to be achieved in the system to combat unwanted emissions and to create very efficient engine and method of operation.

The invention is also directed to a method of operating an internal combustion engine with a split chamber design to provide for staged combustion in the engine. The method includes the steps of forming at least one primary and secondary combustion chamber which are defined by a cylinder means and piston means, wherein the primary and secondary combustion chambers are communicable with one another. During a cycle of the engine, the action of the piston means will cause air within the cylinder to flow through the primary combustion chamber at a predetermined rate and volume. As air flows through the primary combustion chamber, a predetermined amount of fuel will be admitted into the primary combustion chamber to form a fuel/air mixture. The fuel/air mixture is ignited within the primary combustion chamber to generate a first stage of combustion therein. Subsequently, the ignited fuel/air mixture is caused to expand into and continue to burn within the secondary combustion chamber for continued burning of the fuel/air mixture in a second stage of combustion within the secondary combustion chamber. Expansion of the ignited fuel/air mixture within the secondary combustion chamber will act on the piston means to provide driving power to the piston generating output power from the engine. The method of the invention results in a number of advantages including reducing unburned hydrocarbons and the formation of nitrous oxides in the combustion process. Additionally, the engine design and method of operation will allow higher efficiency and high RPM operation and will also produce large amounts of torque at lower power settings as well as higher compression ratios for better fuel economy and power output.

BRIEF DESCRIPTION OF THE DRAWINGS

These and other objects and advantages of the internal combustion engine design and method of operation will become apparent upon a further reading of the detailed description in conjunction with the drawings, wherein:

FIGS. 3-6 show a series of simplified schematic cross sectional views of the engine cylinder showing various stages of operation during one cycle of the internal combustion engine of the invention;

FIG. 7 shows a simplified generally schematic cross sectional view of an alternate embodiment of the engine cylinder including primary and secondary combustion chambers therein;

FIG. 8 is a top schematic view of the engine cylinder containing the primary and secondary combustion chambers taken along line 8—8 of FIG. 7;

FIG. 9 is a simplified generally schematic cross sectional view of another alternate embodiment of the invention showing the engine cylinder including primary and secondary combustion chambers therein;

FIG. 10 is a top schematic view of the engine cylinder containing the primary and secondary combustion chambers taken along line 10—10 of FIG. 9;

FIG. 11 shows a simplified generally schematic cross sectional view of an alternate embodiment of the invention showing the engine cylinder including a plurality of primary combustion chambers associated with one or more secondary combustion chambers in the engine cylinder;

FIG. 12 is a top schematic view of the engine cylinder containing the primary and secondary combustion chambers taken along line 12—12 of FIG. 11;

FIG. 13 shows a simplified schematic cross sectional view of the engine cylinder for another alternate embodiment of the invention showing formation of the primary combustion chamber within the cylinder block being coupled to the secondary combustion chamber within the cylinder;

FIG. 14 is a top schematic view of the engine cylinder containing the primary and secondary combustion chambers taken along line 14—14 of FIG. 13;

FIG. 15 shows a simplified schematic cross sectional view of the engine cylinder for another embodiment of the invention showing the split chamber design including a plurality of primary combustion chambers formed in conjunction with a single secondary combustion chamber in the cylinder; and FIG. 16 is a top schematic cross section of the engine cylinder taken along line 16—16 of FIG. 15.

DETAILED DESCRIPTION OF THE INVENTION

Figure 1:
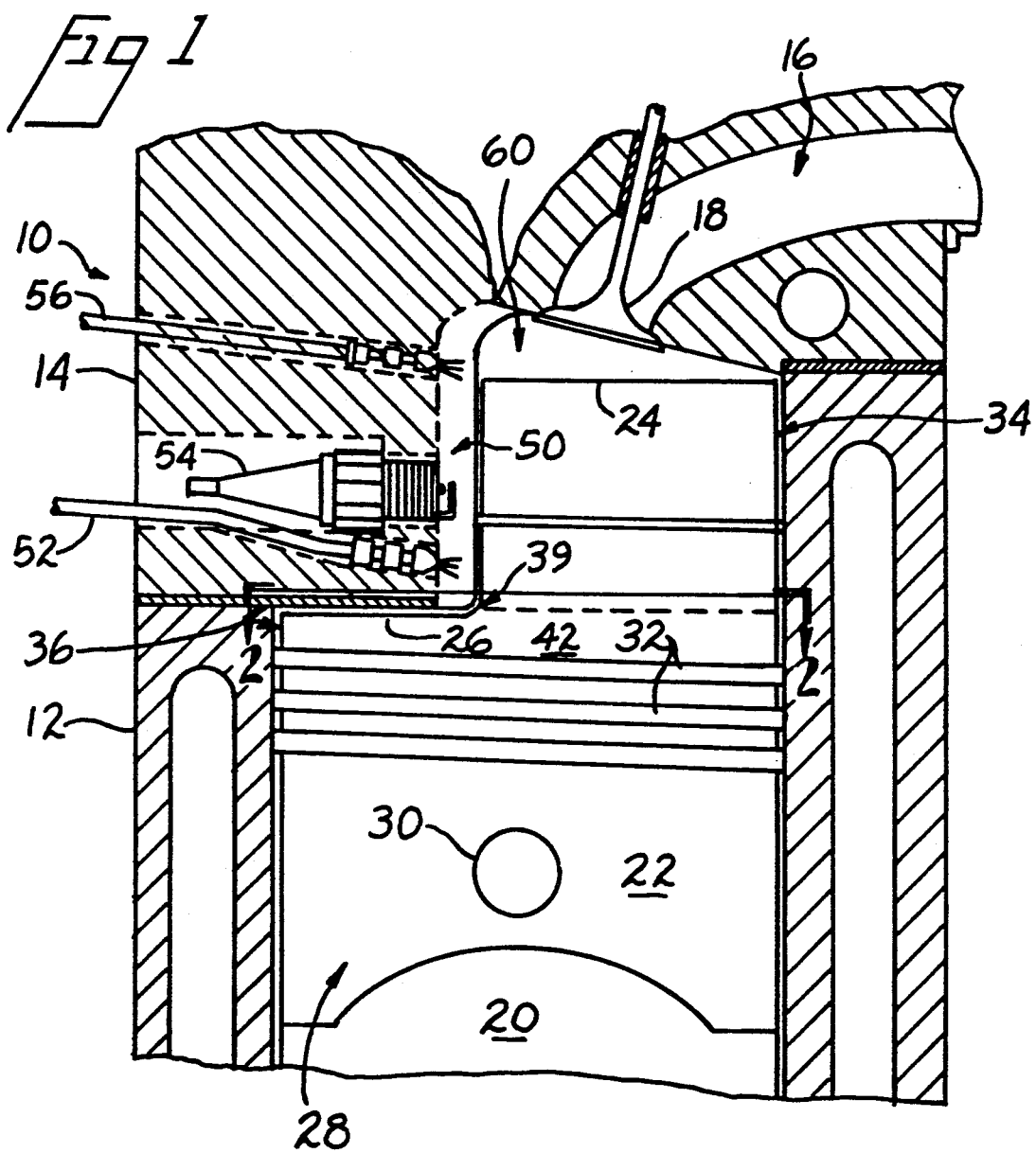
FIG. 1 is a partially cut away sectional view taken through an engine cylinder and cylinder head containing the split chamber and piston means as well as the primary and secondary combustion chambers of a preferred embodiment of the invention.
Figure 2:
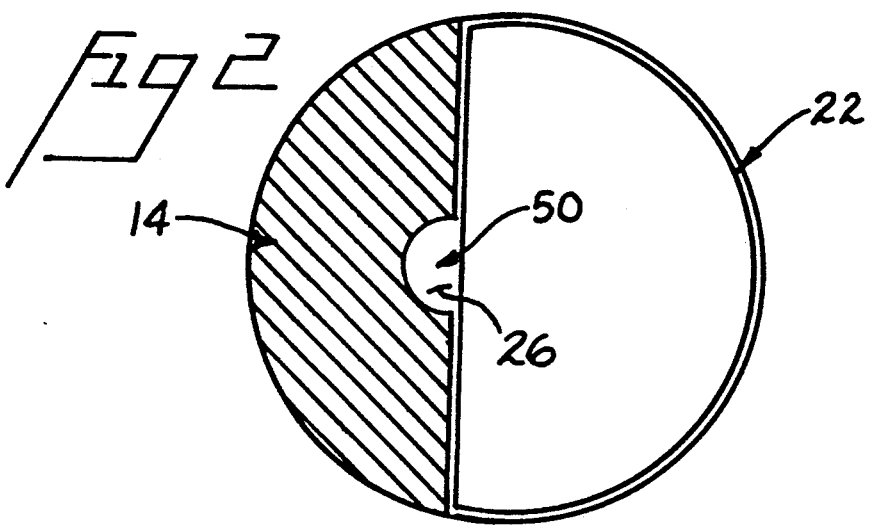
FIG. 2 is a top schematic view of the engine cylinder containing the primary and secondary combustion chambers taken along line 2—2 of FIG. 1.

Referring now to FIGS. 1 and 2, a preferred embodiment of the invention will be described wherein the schematic illustration of FIG. 1 shows one of a plurality of cylinders within an internal combustion engine 10. The engine 10, the cylinder generally comprises a cylinder block 12 and cylinder head 14 having an exhaust port 16 with exhaust valve 18 disposed therein and communicating with the cylinder chamber 20 formed therein. Conventionally, an intake port and intake valve are also provided in association with the cylinder chamber 20 although not explicitly shown in FIG. 1. A piston 22 is disposed in cylinder chamber 20 for reciprocating movement and includes a plurality of working faces 24 and 26 formed on the upper region of body portion 28 thereof. The piston is made to move in reciprocating fashion by means of a pivotally attached connecting rod (not shown) which is coupled to body portion 28 by means of connecting pin or the like at aperture 30. In the conventional manner, the connecting rod will transmit motion and output power through an engine crank shaft (not shown) in operation of the engine 10. The piston body portion 28 is e effectively sealed within the cylinder chamber 20 by means of a plurality of O-rings 32 to provide for compression seals of an air/fuel mixture within the cylinder chamber 20. The cylinder chamber 20 is formed in at least two regions generally designated 34 and 36 respectively wherein each of the regions 34 and 36, separated by an imaginary line 38, define a predetermined volume within the cylinder chamber 20. The formation of the cylinder chamber 20 into a plurality of regions may be termed a "split chamber" design, which allows for a "split combustion chamber" design essentially within the main engine cylinder 20 shown in FIG. 1.

The split combustion chamber design is accomplished by providing the piston means 22 with essentially distinct separate portions 40 and 42 each of which has associated therewith one of the working faces 24 and 26 respectively. The piston 22 is essentially formed as having shaped portions corresponding to the plurality of portions 34 and 36 of the split cylinder 20 such that upon upward reciprocating movement of the piston 22, portion 40 of the piston which has a shape corresponding to the region 34 of the cylinder chamber 20, will enter region 34 for compression of the gases therein by means of working face 24. Similarly, upward movement of the piston 22 during a compression stroke of the piston enables portions 42 of the piston to compress the gases within region 36 of the split cylinder chamber 20 by means of working face 26. As should be recognized from reference to FIG. 1, when the working face 24 of portion 40 of the piston 22 reaches line 38 separating regions 34 and 36 in the cylinder chamber 20, the piston 22 will act to separate these regions in the cylinder chamber 20 by means of shearing action created by the correspondingly shaped portions of the piston to the plurality of regions formed in the cylinder chamber 20. The position generally designated 39 will therefore be hereinafter referred to as the shear position. As the piston 22 is shown at its top dead center position in FIG. 1, the split combustion design will be more clearly understood as the description proceeds.

Also seen in FIG. 1, is the formation of a primary combustion chamber 50 formed as a transfer conduit or tunnel which communicates between regions 34 and 36 of the split cylinder 20. Disposed within the primary combustion chamber 50 is a first fuel injector 52, a spark plug 54, and in the preferred embodiment a second fuel injector 56 disposed relative to the position of the first fuel injector 52 and spark plug 54. In general, assuming that the engine 10 is a four-stroke Otto cycle engine, the operating cycle will include intake, compression, expansion and exhaust strokes for each engine cycle. The engine 10 of the present invention will perform several of these operations during an operating cycle in the conventional manner. For example, air will be initially aspirated through an intake port (not shown) during the intake stroke of the piston 22. Upon initiation of a compression stroke by piston 22, air within cylinder chamber 20 will be compressed in a general fashion until upward motion of the piston 22 corresponds to the shear position 39 previously described. At sheer position 39, portions 34 and 36 of the cylinder chamber 20 will be separated, and each of the working faces 24 and 26 of piston 22 will act to compress air within each of these regions separately. In the embodiment shown in FIG. 1, the air within region 36 will be compressed to a higher degree than air within region 34 upon upward travel of piston 22. In this way, the fluid or air within region 36 will flow to the lower pressure region 34 through the primary combustion chamber 50. The flow of fluid from region 36 to region 34 through primary combustion chamber 50 occurs due to the pressure differential occurring between these regions upon upward travel of piston 22 to its top dead center position.

As flow occurs between regions 36 and 34, fuel is admitted through the first fuel injector 52 in timed relationship with the operating cycle of the engine, to be mixed with the air flowing therein. The fuel/air charge disposed within primary combustion chamber 50 is then ignited by the spark plug 54 in appropriate timed relationship with the operating cycle of the engine, wherein the then burning fuel/air mixture will continue to flow through primary combustion chamber 50 by continued upward movement of piston 22. Depending upon the load conditions imposed upon the engine 10, it may then be necessary to inject an additional amount of fuel by means of second fuel injector 56 as will be hereinafter described in more detail. The burning fuel/air mixture will thereafter flow into the secondary combustion chamber 60 formed in region 34 of the cylinder chamber 20 and associated with working face 24 of piston 22. The secondary combustion chamber 60 includes only an air charge therein, which is then mixed with the burning fuel/air mixture expanding from the primary combustion chamber 50 upon completion of the compression stroke of piston 22. Continued combustion of the fuel/air mixture about the working face 24 of piston 22 will release heat energy to drive the piston in a direction causing expansion of the secondary combustion chamber 60 resulting in downward movement of piston 22. The expansion stroke of piston 22 will result in rotation of the engine crank shaft to produce torque and provide power in the conventional manner.

Turning to FIG. 2, there is illustrated a view taken along the line 2—2 of FIG. 1 which shows the working face 24 of piston 22 at the top dead center position as seen in FIG. 1. Also seen in FIG. 2 is the portion of the cylinder head 14 which includes the primary combustion chamber 50 formed as a transfer conduit therein. Working face 26 of piston 22 is also seen at the bottom portion of the primary combustion chamber 50. The primary combustion chamber 50 essentially forms a restricted passageway between regions 34 and 36 as seen in FIG. 1, and its particular dimensions are designed to allow a predetermined volume of air to be forced through the primary combustion chamber 50 at a predetermined velocity. As air is forced through the primary combustion chamber 50, the first fuel injector 52 is matched to the air flow through the primary combustion chamber 52 in a known manner to create a fuel/air mixture which is ignitable by means of spark plug 54.

In the operation of the engine 10 of the invention, mixture of the fuel into the air traveling within the primary combustion chamber 50 will not necessarily be provided at the correct stoichiometric proportions as is done in conventional spark ignition engines. The air supply into the primary combustion chamber 50 is not throttled in any respect, and the rate of fuel injection will be matched to the rate of air passing through the primary combustion chamber 50 to form a desired fuel rich condition which will be described in more detail subsequently. As should be recognized, no throttle plates are utilized for injecting the proper amount of air into the primary combustion chamber 50, and fuel is directly injected into the primary combustion chamber 50 in a manner similar to diesel fuel injection techniques to form a fuel rich mixture at this location. The location of spark plug 54 is related to the location of fuel injection from first fuel injector 52 to ignite the fuel rich mixture immediately above the injection of fuel. At low load conditions, the amount of fuel admitted into the primary combustion chamber 50 by means of first fuel injector 52 may be sufficient to achieve idle or very low load operation of the engine. In this case, there will be no need to use the second fuel injector to achieve the desired combustion characteristics in operation of the engine. At higher load conditions, additional fuel may be necessary to achieve the power output desired from the engine accordingly.

The split combustion chamber principle as well as staged combustion within the engine cylinder will be understood more clearly with reference to FIGS. 3-6 which show various stages of a compression cycle in operation of the engine.

In FIG. 3, piston 22 is forced upwardly by means of engine crank shaft rotation in the normal matter to begin initial compression of air disposed within cylinder chamber 20. At this point during the compression cycle, both working faces 24 and 26 of piston 22 act to compress air within cylinder chamber 20 in a general fashion. Upon continued upward movement of piston 22 as seen in FIG. 4, additional compression of air within cylinder chamber 20 is accomplished generally within regions 34 and 36 of the cylinder chamber 20.

In FIG. 5, the upward movement of piston 22 has reached the shear point 39 wherein the portion 40 of piston 22 which is shaped so as to correspond with portion 34 of the cylinder chamber 20, meets the region 34 so as to separate regions 34 and 36 within cylinder chamber 20. At this point in the compression cycle, the cylinder chamber 20 is "split" into a plurality of chambers by the shearing action of portion 40 of piston 22 in conjunction with the shaped cylinder chamber 20. As previously described, air form one of the regions 34 or 36 will be more highly compressed upon upward travel of the piston 22, to cause a pressure differential resulting in flow from one region to the other through the primary combustion chamber 50. In general, the cylinder chamber 20 is split into two or more compartments by the action of the piston 22 during the compression cycle in the split chamber design. When piston portion 40 reaches the shear point 39, compression of air within regions 34 and 36 will be accomplished separately by working faces 24 and 26 respectively, of piston 22. Air will be forced into the primary combustion chamber 50 as shown by arrow 62 at a predetermined volume and velocity dependant upon the dimensions of primary combustion chamber 50 and the upward speed of piston 22.

Upon splitting of the cylinder chamber in the compression cycle, fuel will be injected into the primary combustion chamber 50 by means of first fuel injector 52 positioned adjacent the bottom of the primary combustion chamber 50. Fuel will be admitted into the primary combustion chamber 50 at approximately 85% of the correct stoichiometric proportion to the air within primary combustion chamber 50 in preferred operation of the engine. The rate of fuel injection will be matched to the rate of air passing through the primary combustion chamber 50 to assure a fuel rich condition at the position of fuel injection. The fuel rich mixture is ignited by means of spark plug 54 in timed relationship with upward movement of piston 22. A fuel rich mixture is desired at this location within primary combustion chamber 50 as the fuel rich mixture will burn at a low temperature, thus forming less nitrous oxides during the combustion process. Additionally, as there is an abundance of fuel in the ignition area, the more active carbon and hydrogen in the fuel content will combine with the available oxygen in the primary combustion chamber 50, thereby minimizing the opportunity for free nitrogen to combine with free oxygen which will also inhibit the formation of nitrous oxides.

According to the stoichiometric relationships of fuel to air, there is a limit to the total amount of fuel which can be injected adjacent the bottom portion of the primary combustion chamber 50 and still be within the fuel/air mixture proportions to allow spark ignition. Thus, a predetermined amount of fuel will be injected by first fuel injector 52 in accordance with the volume and rate of air moving upwardly within the primary combustion chamber to insure the fuel rich condition but also to allow spark ignition of the mixture. Upon further upward movement of the piston 22, the ignited fuel rich mixture will continue upwardly within the primary combustion chamber 50 and towards the secondary combustion chamber 60 formed in region 34 of the cylinder chamber 20. The primary combustion chamber 50 communicates with a secondary combustion chamber 60 at its upper end to allow transfer of the burning and expanding fuel/air mixture from the primary combustion chamber 50 to the secondary combustion chamber 60 upon further compression of the piston 22. If additional fuel is necessary for the particular load conditions encountered by the engine, this additional fuel will be injected at the top of the primary combustion chamber by means of second fuel injector 56.

Fuel injection at the top of the primary combustion chamber 50 will introduce fuel into the already burning primary fuel/air mixture created by first fuel injector 52 which is traveling upwardly within the primary combustion chamber 50. It should be recognized that the burning mixture within primary combustion chamber 50 produces a high temperature zone, wherein secondary fuel injection at the upper portion of primary combustion chamber 50 into the burning mixture will totally vaporize all fuel components of the secondary fuel injection. Injection of additional fuel at the top portion of primary combustion chamber 50 will again create a fuel rich mixture which will already be burning to some extent although oxygen within primary combustion chamber 50 has been somewhat depleted by initial combustion. The fuel rich mixture will therefore require additional oxygen for complete burning which is not readily available in the primary combustion chamber 50.

Upon continued upward movement of piston 22 to the top dead center position as shown in FIG. 6, the fuel rich mixture will expand into and be forced from primary combustion chamber 50 to secondary combustion chamber 60 where it will continue to burn in a second stage of combustion. The secondary combustion chamber contains only compressed air therein which provides the needed oxygen for continued combustion of the fuel/air mixture entering the secondary combustion chamber 60 from primary combustion chamber 50. A second stage of combustion will therefore occur in the secondary combustion chamber 60, being the final combustion of both primary and secondary fuel injection occurring in the primary combustion chamber 50. As the fuel/air mixture is introduced into the secondary combustion chamber 60 from primary combustion chamber 50, turbulence of the mixture occurs upon expansion into chamber 60. The shape of secondary combustion chamber 60 may provide "squish" areas which will add to such turbulence. From this generated turbulence, the air/fuel mixture is extremely well mixed and facilitates proper and complete burning thereof.

During the second stage of combustion, some nitrous oxides which are formed from initial combustion in the primary combustion chamber 50 will be broken down in the second stage of combustion within secondary combustion chamber 60. The second stage of combustion in chamber 60 creates a reburning of the fuel by-products formed in initial combustion, thereby further reducing emissions of noxious gases. It is also found that due to the turbulent mixing of fuel/air from primary combustion chamber 50 and the excess air located in secondary combustion chamber 60, that any unburned hydrocarbons within the fuel/air mixture will be readily burned in the second stage of combustion thereby virtually eliminating unburned hydrocarbon emissions.

It should be recognized that the split chamber design as well as the staged combustion process requires no throttling techniques and no throttle plates are necessary in the construction of the engine. Thus, the engine will not run under vacuum conditions associated with throttling techniques, and pumping losses will be significantly reduced. Similarly, by the elimination of throttle plates in the engine design, no low vacuum conditions are created which have heretofore required the use of excessive ignition advance to allow completion of combustion within the combustion chamber. The split chamber, staged combustion design drastically reduces the need for ignition advance, thus allowing more of the fuel to be burned at or after top dead center of piston travel to thereby achieve the most benefit from the combustion process. A significant portion of expansion of the fuel/air mixture during combustion will therefore occur immediately after top dead center of the piston 22, wherein the pressure from the burning fuel will act more efficiently on the piston to achieve the most work from the system. During part throttle operation of the engine, undesirable vacuum conditions are eliminated thereby eliminating the need for significant ignition advance and along with higher compression ratios achieved by the invention, allow faster and more complete burning of the fuel in the system. Similarly, during full power, higher RPM conditions, no significant ignition advance will be necessary as the system of the invention allows for much higher compression ratios wherein the fuel will burn more rapidly.

In the engine design, more rapid burning of the fuel products will occur due to favorable combustion conditions rather than low vacuum conditions. Also, more complete burning of the fuel will occur due to better mixing and turbulence of the fuel/air mixture within the primary combustion chamber 50 and secondary combustion chamber 60. The higher compression ratios achievable in the system will be in the range of about 15 to 1 or higher rather than the theoretical optimum of 9 to 1 in conventional engine design. As mentioned previously, compression ratios may be limited in the conventional engine design by preignition problems in the combustion process. In a conventional spark ignition engine, the theoretical compression ratio of about 9 to 1 is not achievable under part throttle conditions. Due to throttling techniques, in part throttle conditions, the effective compression ratio is usually far lower and may be as little as 3 to 1 or less. In the split combustion process of the invention, the system which eliminates the use of throttle plates will have an effective compression ratio essentially the same the theoretical compression ratio of 15 to 1 or higher under part throttle conditions. The higher compression ratios of 15 to 1 or higher will be achievable because of the design parameters of the engine. It should be recognized that the higher compression ratios achieved by the invention will result in more efficient operation of the engine by utilizing the available heat in a burning fuel more effectively.

In the staged combustion of the invention, the system operates with excess air found in the secondary combustion chamber 60 to make the system preignition resistant. The flame front and the fuel rich mixture expanding into the secondary combustion chamber 60 from the primary combustion chamber 50 will therefore burn in the second stage of combustion in a uniform and predictable manner. Additionally, as excess air is found in the system, complete burning of all hydrocarbons will be achieved without the need for a reburning process downstream of the exhaust as conventionally used in present engine designs. Similarly, as unburned hydrocarbons will be reduced significantly, catalytic converters may not be necessary to achieve the desired emissions criteria. The staged combustion process also allows much reduced nitrous oxides formation, thereby eliminating the need for exhaust gas recirculation systems to achieve reduced emissions thereof.

The rapid burning of fuel in the split chamber design and staged combustion process of the invention may also make use of quick burning fuels, and thus a low octane fuel may be sufficient and even preferable to accommodate the need for faster burning of the fuel. A high octane fuel is therefore not needed and may in fact be a detriment to the need for quick burning of the fuel in operation of the engine. High octane fuels are slower burning and may impede fast and complete burning of the fuel as it enters the secondary combustion chamber 60 in the second stage of combustion. It is noted that if the fuel does not burn immediately at the flame front upon expansion into the secondary combustion chamber 60, preignition effects may occur similar to that in a compression ignition engine when fuel does not burn fast enough. The need for higher octane fuels and the cost thereof may therefore be eliminated.

After the compression cycle as described with reference to FIG. 3-6, an exhaust cycle will be carried out in the conventional manner by means of exhaust port 16 and operation of exhaust valve 18 disposed therein, as seen in FIG. 1. In a conventional engine design, throttling techniques have led to significant pumping losses and fuel lost when injected into the system during an exhaust cycle. In the split chamber stage combustion design of the invention, fuel is not injected until after the exhaust cycle has been completed and thus no loss of fuel to the exhaust is possible. Injection of the fuel can be provided at a later point in the operation cycle of the engine as no throttle plates which cause low vacuum conditions are used and the amount of ignition advance which may be needed is greatly reduced.

It is also noted that in the split chamber, staged combustion design and method of operation of engine 10, a turbocharger may be used more effectively in the engine. With a turbocharger, engine operation will be more effective at lower RPMs due to the higher weight of gases exhausting from the cylinder at low RPMs as compared to a conventional engine. Such a weight increase in the gases is generated from the excess air used in the system as found in the secondary combustion chamber 60 and used in the second stage of combustion in the engine. In association with a turbocharger, the heavier gases will keep the impeller of the turbocharger turning at higher RPMs at lower power levels. At higher power levels, if a turbocharger is used, the effectiveness will be maintained similar to that with conventional engine designs.

The split chamber, stage combustion system of the invention, and the advantages gained thereby, may be appreciated in that the design may be used in the development of a two cycle engine having less then one-half of the displacement of a comparable four cycle engine while producing more usable power and much better fuel economy. The power increase achievable by the design of the invention will be especially apparent at lower RPMs, and will also produce an engine with better "driveability" than present engine designs. Such a two cycle engine may be produced with 4 cylinders to produce four power strokes resulting in an engine nearly as smoothly running as an 8 cylinder four cycle engine. In such a two cycle design, no valve train would be required, thereby allowing higher RPM operation of the engine. As no valve trains would be necessary, this expense as compared to port systems would also be eliminated. A two cycle engine would also be much lighter than the conventional four cycle engine, which would reduce the heavy structure needed to support the engine and reduce costs associated therewith. Unlike conventional two cycle engines, an engine constructed in accordance with the invention would not have a "popcorn" popper sound and would produce large amounts of torque at low power settings and RPMs. As previously described, the nitrous oxides and hydrocarbons emissions should be well below any existing emissions requirements, and may even allow lower emission standards to be set. All this coupled with higher theoretical and effective compression ratios achievable in the system will drastically increase the fuel economy and power output per fuel unit burned in the engine, thereby resulting in a higher efficiency engine which maintains the emission qualities desired of engines in the present day. Additionally, the thermoefficiency of the engine design is much higher, and the engine will therefore will have less heat rejection into the cooling system of the engine which will enable utilization of a smaller cooling system.

Turning now to FIGS. 7 and 8, an alternate embodiment of a split chamber, stage combustion design is shown. In many respects, the embodiment of FIG. 7 is similar to that described with reference to FIGS. 1-6, and common elements thereof have been indicated by similar reference numerals. The main difference in the embodiment of FIG. 7 is seen in that the primary combustion chamber 80 of the design is formed within piston 22 rather than in cylinder head 14 of the engine. The primary combustion chamber 80 is formed as a transfer tube or tunnel in portion 40 of piston 22. In this embodiment, the fuel injectors 52 and 56 as well as the spark plug 54 will be mounted so as to extend into the space machined into portion 40 of piston 22 forming the primary combustion chamber 80. Operation of the engine during the compression cycle thereof will be substantially similar to that previously described with air being forced into and through primary combustion chamber 80 after the shear point has been reached upon upward movement of piston 22 within cylinder chamber 20.

Another embodiment of the split chamber, staged combustion design is shown in FIGS. 9 and 10, where again similar components have been indicated by similar reference numerals. In the embodiment of FIGS. 9 and 10, the primary combustion chamber 90 is again formed in the cylinder head 14 of the engine as a transfer tube or tunnel through which air will be forced through during a compression cycle of the engine. In this embodiment, the secondary combustion chamber 92 is formed in conjunction with working face 26 of piston 22. The cylinder chamber 20 is formed to provide secondary combustion chamber 92 between working face 26 and the cylinder chamber wall. In this embodiment, the volumes of the regions in cylinder chamber 20 formed upon reaching the shear point in upward travel of piston 22 are such that air will flow downwardly through primary combustion chamber 90 and into secondary combustion chamber 92 upon continued upward movement of piston 22. Thus, the first fuel injector 52 is positioned at the top of primary combustion chamber 90 with spark plug 54 adjacent thereto and second fuel injector 56 disposed at the bottom of primary combustion chamber 90 relative to the secondary combustion chamber 92. In this embodiment, air within region 34 will be more highly compressed than in region 36, such that flow will occur from region 34 to region 36 through primary combustion chamber 90, due to the pressure differential created between the two regions. In other respects, operation of the engine in this embodiment will be similar with that previously described.

Turning now to FIGS. 11 and 12, another alternate embodiment of the engine design is shown, with the shape of the piston 22 being modified. The piston 22 includes portion 100, which corresponds to previously described portion 40, but has a circular cross-section. Similarly, the portion of the cylinder chamber 20 corresponding to portion 100 of piston 22 is also has a circular cross-section to accommodate portion 100 thereof. Portion 100 of piston 22 will essentially have a working face 24 operating within the region of cylinder chamber 20 after the shear point has been reached in upward travel of piston 22. The primary combustion chamber 50 and secondary combustion chamber are formed in a similar manner to that described with reference to FIGS. 1 and 2.

Another embodiment of the invention is shown in FIGS. 13 and 14 wherein the primary combustion chamber 110 is formed completely within cylinder head 14 as a separate opening or tunnel leading from the lower chamber to the upper chamber in the split chamber design of cylinder 20. In this embodiment, primary combustion chamber 110 is machined into the cylinder block so as to provide a pathway for compressed air from one portion of the cylinder chamber 20 into primary combustion chamber 110 at which point fuel is injected and ignited as previously described. The primary combustion chamber 110 has a predetermined volume and essentially functions as that previously described. The primary combustion chamber 110 is coupled to the secondary combustion chamber 60, such that flow and expansion of an ignited fuel/air mixture within primary combustion chamber 110 will proceed into secondary combustion chamber 60 for the second stage of combustion as noted previously. In this embodiment, machining of the primary combustion chamber 110 into the cylinder block may add some expense, but structural strength of both cylinder 20 and piston 22 are maintained to a high degree in the split chamber design.

Turning now to FIGS. 15 and 16, yet another embodiment of the invention is shown to include a split chamber design wherein a plurality of primary combustion chambers 120 are formed in conjunction with one secondary combustion chamber 122. In this embodiment of the invention, the engine cylinder 20 is formed as a split chamber design with one portion being formed above an imaginary line 124 as seen in FIG. 15. The piston 22 has a corresponding portion 126 shaped similarly to the portion 124 of the cylinder 20, and will create multiple chambers within cylinder 20 upon reaching the shear points of engine cylinder 20 at imaginary line 124. It should be recognized that piston 22 will have three working faces in this embodiment of the invention so as to compress air within each of the multiple chambers formed in cylinder 20 and to force air into and through primary combustion chambers 120 and subsequently into secondary combustion chamber 122. Fuel injection occurs within primary combustion chambers 120 as previously described, and a first stage of combustion occurs therein. The burning fuel/air mixture from each of the primary combustion chambers 120 flows and expands into secondary combustion chamber 122 to complete burning in a second stage of combustion.

It should be recognized from the foregoing embodiment, that the split chamber, staged combustion design of the invention allows a great amount of flexibility in the design of the engine to provide desired operating characteristics in the engine. For example, the primary and secondary combustion chambers are adjustable in height and width to a great extent and can be formed in any desired cross sectional shape. The primary combustion chamber is designed to have a certain height and width such that compressed air will be forced therethrough at a predetermined volume and velocity. The length of the primary combustion chamber is important in that a certain length of time and distance is required to allow fuel to be injected and a first stage of combustion initiated as well as to allow for a second fuel injection step if required.

The flexibility in design allows for more efficient combustion of the fuel in the staged combustion process as well as enabling emissions to be reduced significantly without complex or expensive equipment. Although the engine design of the engine has been described with emphasis placed on a 4-stroke engine, the design and method of operation can be applied to either a 4-stroke or 2-stroke method of operation and with any form of positive displacement engine including compression ignition engines, rotary engines, engines with single or multiple cylinder designs, engines with or without a valve train, and normally aspirated or pressure charged engines. The engine design and method of operation allow for exceptionally high compression ratios for more efficient operation of the engine while also achieving significantly reduced emissions in the normal operating cycle of the engine. The design and method of operation also achieve more complete burning of the fuel in the combustion process, and since there are no throttle plates in the engine design, pumping losses are greatly reduced. The amount of ignition advance is therefore greatly reduced which will allow more of the fuel to be burned at or after top dead center of piston travel for more efficient operation of the engine.

The objects and advantages of the engine design and method of operation have been described with respect to various alternative embodiments, but it should be understood that numerous other variations could be made within the scope of the invention. Numerous changes in the details of construction and the combination in the arrangement of parts may be resorted to without departing from the spirit and scope of the invention as defined in the appended claims.

What is claimed is:

1. A method of operating an internal combustion engine having a split chamber engine cylinder configuration and providing stage combustion comprising the steps of:
   1) forming at least first and second regions within an engine cylinder means, wherein said at least first and second regions being separable by a piston means within said cylinder,
   2) forming at least one a primary combustion chamber as a transfer conduit allowing communication between said at least first and second regions of said cylinder, and said at least one secondary combustion chamber,
   3) causing a higher combustion ratio in said first region of said cylinder upon upward movement of said piston means within said cylinder so as to cause air within said first region to flow from said first region to at least said second region through said at least one primary combustion chamber,
   4) admitting fuel to said at least one primary combustion chamber at a pre-determined rate to match air flow through said at least one primary combustion chamber to create a pre-determined air/fuel mixture within said primary combustion chamber,
   5) igniting said air/fuel mixture within said primary combustion chamber in a first stage combustion process,
   6) causing the flow of said ignited air/fuel mixture to continue through said at least one primary combustion chamber into said at least one secondary combustion chamber which has an air only atmosphere therein in a second stage combustion process, such that combustion of said air/fuel mixture is completed in said at least one secondary combustion chamber.

2. The method of operating an internal combustion engine as in claim 1, further comprising steps of:
   injection additional fuel into the already ignited air/fuel mixture within said primary combustion chamber as said ignited air/fuel mixture flows therethrough, under higher power requirements of said engine, to allow said ignited air/fuel mixture to complete combustion in said secondary combustion chamber as said ignited mixture flows into said secondary combustion chamber to allow a higher compression ratio to be utilized in said operation of said internal combustion engine.

3. A method of operating an internal combustion engine with a split chamber design for stage combustion comprising the steps of:
   1) forming at least one primary combustion chamber and at least one secondary combustion chamber in association with a cylinder means having at least two regions formed therein and piston means within said engine, wherein said at least one primary combustion chamber is formed as a transfer conduit between said at least two regions of said cylinder means so as to be communicable with said at least one secondary combustion chamber;
   2) causing air within said cylinder means to flow through said at least one primary combustion chamber at a predetermined rate and volume;
   3) admitting a predetermined amount of fuel to said at least one primary combustion chamber to form a fuel/air mixture, therein;

4) igniting said fuel/air mixture within said at least one primary combustion chamber to generate a first stage of combustion;

5) causing the flow of the said ignited fuel/air mixture to said at least one secondary combustion chamber for continued burning of said fuel/air mixture in a second stage of combustion within said at least one secondary combustion chamber, wherein expansion of said ignited fuel/air mixture within said at least one secondary combustion chamber will act on said piston means to provide driving power to said piston means.

4. The method of operating an internal combustion engine as in claim 3, wherein:
said at least one secondary combustion chamber is formed in one of said at least two regions formed in said cylinder means.

5. The method of operating in an internal combustion engine as in claim 3, wherein:
said step of causing air within said cylinder means to flow through said primary combustion chamber is accomplished by forming said piston means to have correspondingly shaped portions to said at least two regions of said cylinder means, and forming said at least one primary combustion chamber as a transfer conduit between said at least two regions, wherein slidable movement of said piston means will act to compress air within said at least two regions of said cylinder means, and a pressure differential between said at least two regions will cause flow through said at least one primary combustion chamber.

6. The method of operating an internal combustion engine as in claim 3, wherein,
said step of causing the flow of said ignited fuel/air mixture to said at least one secondary combustion chamber includes allowing expansion of said ignited fuel/air mixture from said at least one primary combustion chamber into said at least one secondary combustion chamber wherein said ignited fuel/air mixture will be mixed with an air only atmosphere within said at least one secondary combustion chamber for complete burning of the fuel within the fuel/air mixture in said second stage of combustion.

7. The method of operating an internal combustion engine as in claim 3, further comprising the steps of:
admitting a predetermined amount of fuel into said at least one primary combustion chamber after said step of igniting said fuel/air mixture within said primary combustion chamber so as to admit fuel into the already burning fuel/air mixture to maintain a fuel rich mixture which is caused to flow into said at least one secondary combustion chamber for continued burning in said second stage of combustion.

8. The method of operating an internal combustion engine as in claim 3, wherein,
said step of admitting a predetermined amount of fuel to at least one primary combustion chamber includes admitting an amount of fuel to form a fuel rich fuel/air mixture wherein the rate of admission of fuel will be matched to the volume and velocity of fluid passing through said at least one primary combustion chamber.

9. The method of operating an internal combustion engine as in claim 8, wherein,
said step of admitting fuel into said at least one primary combustion chamber comprising admitting fuel at approximately 85% of the correct stoichiometric proportion to the amount of air within said at least one primary combustion chamber.

10. A split chamber, staged combustion internal combustion engine comprising:
means defining a cylinder having at least two regions formed therein,
piston means slidably disposed within said cylinder;
a plurality of combustion chambers formed in association with said cylinder including at least one primary combustion chamber and at least one secondary combustion chamber being communicable with said primary combustion chamber wherein said at least one primary combustion chamber is formed as a transfer conduit between said at least two regions formed in said cylinder;
fuel delivery means associated with said at least one primary combustion chamber operable to admit fuel into said primary combustion chamber at preselected intervals and in predetermined amounts relative to the position of said piston means to form a fuel/air mixture within said primary combustion chamber;
means for igniting said fuel in said primary combustion chamber in a first stage of combustion within said primary combustion chamber wherein said ignited fuel/air mixture will be forced into said secondary combustion chamber by slidable movement of said piston means for continued burning of said fuel/air mixture in a second stage of combustion.

11. In internal combustion engine of claim 10, wherein,
said secondary combustion chamber is formed in one of said at least two regions formed in said cylinder so as to be communicable with said at least one primary combustion chamber.

12. The internal combustion engine of claim 10, wherein,
said transfer conduit is formed at least partially within said piston means and is communicable with said at least two regions formed in said cylinder.

13. The internal combustion engine of claim 10, wherein,
said means defining a cylinder are shaped such that said at least two regions formed therein relate to correspondingly shaped portions of said piston means, and said at least one secondary combustion chamber is formed in said cylinder as an additional area in one of said at least two regions formed in said cylinder relative to a portion of said piston means associated with said region of said cylinder.

14. The internal combustion engine of claim 10, wherein,
said piston means is formed as having a plurality of working faces cooperating with said at least two regions formed in said cylinder, wherein slidable movement of said piston means will result in said at least two regions being separated within said cylinder such that said working faces of said piston means will individually compress fluid within each of said at least two regions.

15. The internal combustion engine of claim 14, wherein,
said piston means is formed as having distinct separate portions associated with each of said at least two regions formed in said cylinder, with each of said portions having one of said working faces associated therewith, wherein slidable motion of said piston means will act to separate said at least two regions in said cylinder by means of a shearing action created by said portions of said piston.

16. The internal combustion engine of claim 10, wherein,
said transfer conduit is formed at least partially in the cylinder head of the engine and communicates between said at least two regions of said cylinder.

17. The internal combustion engine of claim 16, wherein,
said transfer conduit is formed wholly within said cylinder head of said engine and communicates between said at least two regions formed in said cylinder.

18. The internal combustion engine of claim 10, wherein,
a plurality of primary combustion chambers are formed as transfer conduits between said at least two regions formed in said cylinder with each of said primary combustion chambers being communicable with said at least one secondary combustion chamber formed in said cylinder.

19. The internal combustion engine of claim 18, wherein,
said piston means is formed as having a plurality of working faces, each of which acts upon fluid in said cylinder in association with each of said plurality of primary combustion chambers and said at least one secondary combustion chamber individually and separately from one another.

20. The internal combustion engine of claim 10, wherein,
said at least two regions formed in said cylinder have air therein which is compressed upon slidable movement of said piston means within said cylinder, wherein a pressure differential is created between said at least two regions causing air to flow from one of said regions to another of said regions through said at least one primary combustion chamber.

21. The internal combustion engine of claim 20, wherein,
said at least one secondary combustion chamber is formed in said region into which flow is directed from said at least one primary combustion chamber, and has only air therein into which said ignited fuel/air mixture is introduced from said at least one primary combustion chamber.

22. The internal combustion engine of claim 10, wherein,
said fuel delivery means comprises at least a first fuel injector positioned to admit fuel into said at least one primary combustion chamber at a region thereof adjacent one of said at least two regions formed in said cylinder, and said means for igniting said fuel/air mixture is a spark plug associated with said at least one primary combustion chamber and positioned relative to said first fuel injector in the direction of flow of said fuel/air mixture.

23. The internal combustion engine of claim 22, wherein,
said fuel delivery means further includes a second fuel injector associated with said at least one primary combustion chamber and positioned relative to said first fuel injector and said spark plug so as to admit fuel into the already ignited fuel/air mixture burning within said at least one primary combustion chamber.

* * * * *

UNITED STATES PATENT AND TRADEMARK OFFICE
CERTIFICATE OF CORRECTION

PATENT NO. : 5,076,229
DATED     : December 31, 1991
INVENTOR(S) : Russell A. Stanley It is certified that error appears in the above-indentified patent and that said Letters Patent is hereby corrected as shown below:

On the title page and Col. 1 lines 1-4: Should read:

Item [54]: INTERNAL COMBUSTION ENGINES AND METHOD OF OPERATING AN INTERNAL COMBUSTION ENGINE USING STAGED COMBUSTION Col. 18, line 6, should read:--ration and providing staged combustion comprising the--.

line 17, should read:--3) causing a higher compression ratio in said first re- --.

line 41, should read: --injecting additional fuel into the already ignited air/f- --.

line 52, should read: --engine with a split chamber design for staged combustion--.

Signed and Sealed this

Twenty-ninth Day of June, 1993

Attest:

MICHAEL K. KIRK

*Attesting Officer*     *Acting Commissioner of Patents and Trademarks*